Jan 6, 1931.                G. HORVATH                1,787,863
                              SCAFFOLD
                    Filed Aug. 19, 1929     6 Sheets-Sheet 1

Inventor
Gabriel Horvath
By *[signature]*
                                              Attorney

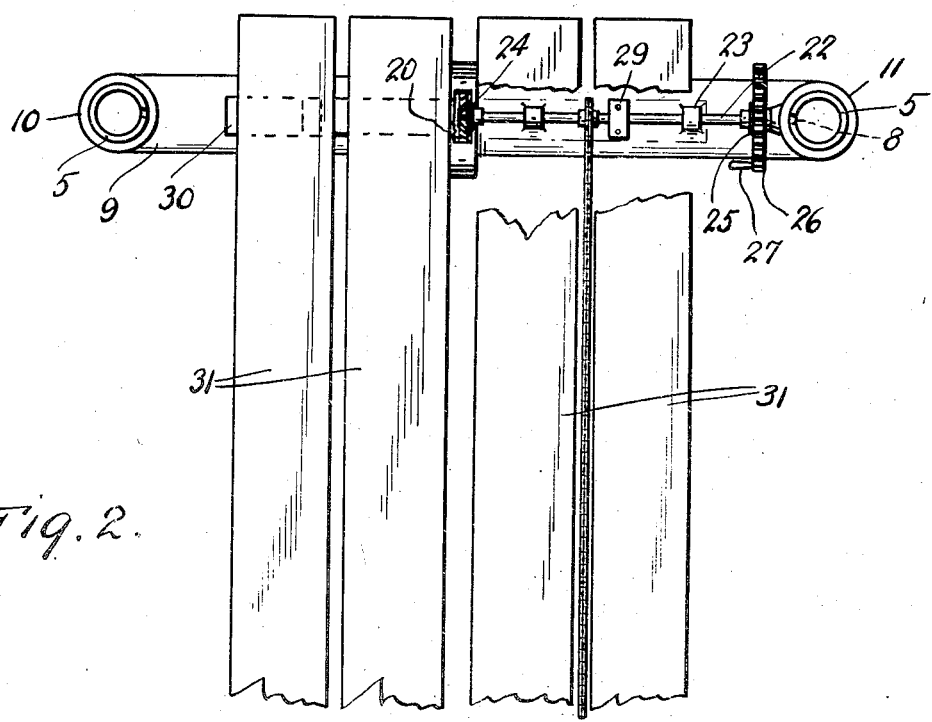
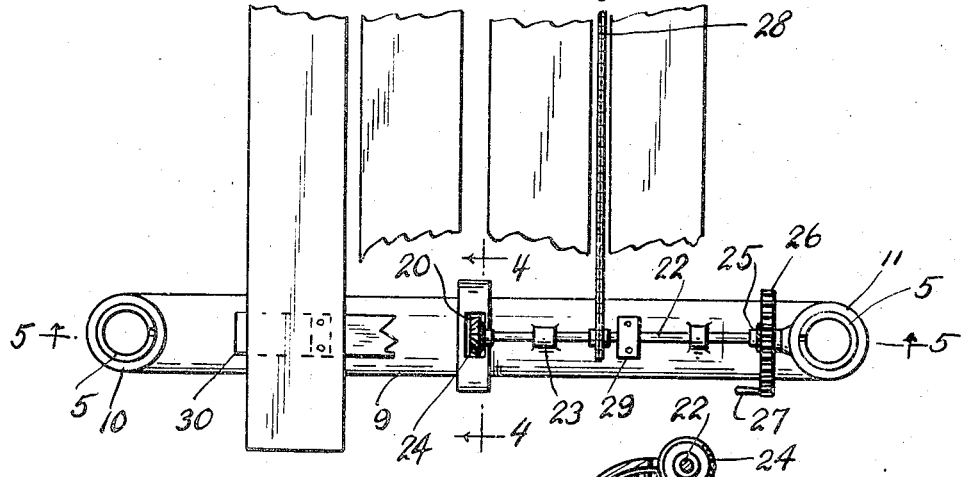
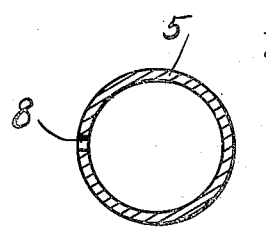
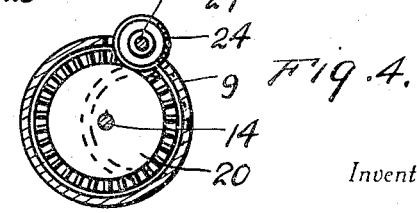

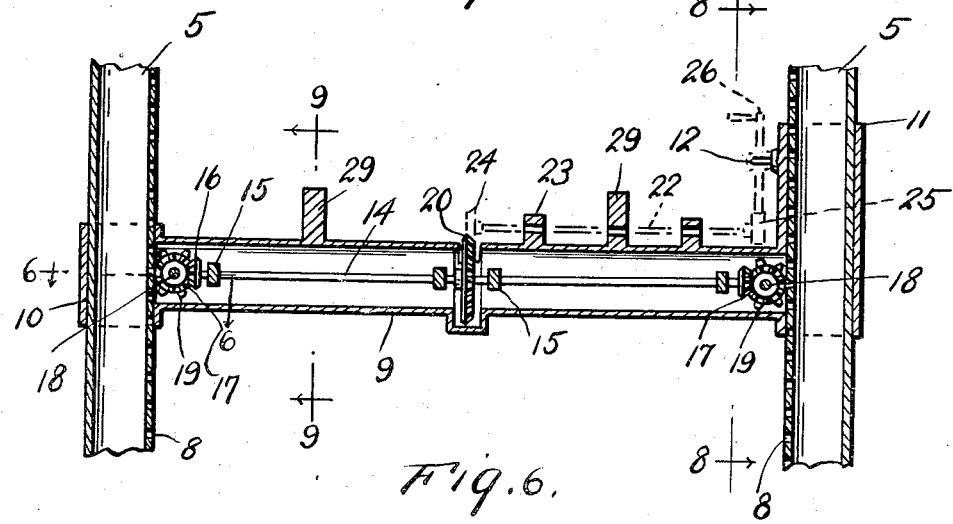
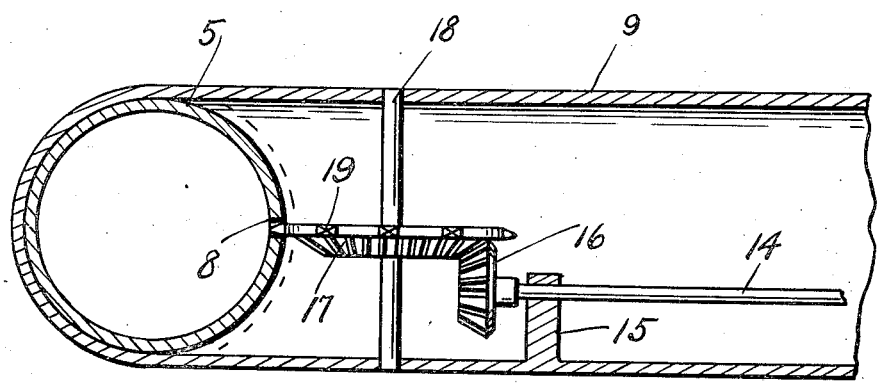
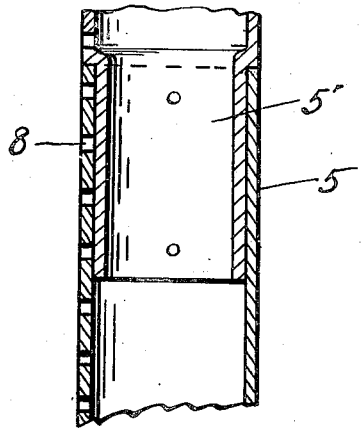

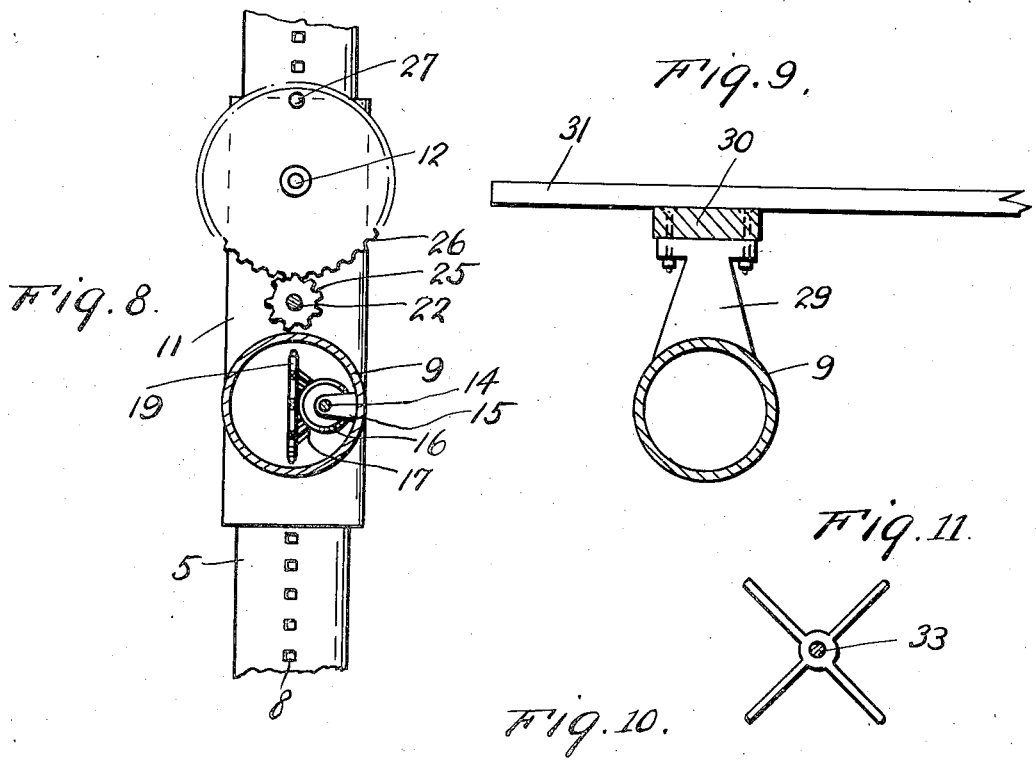
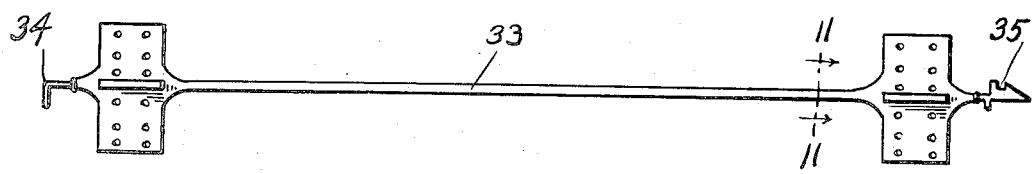
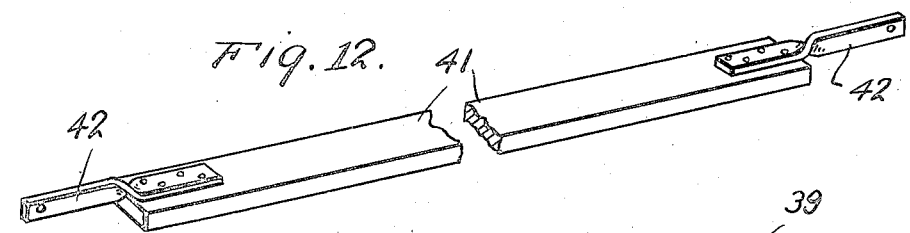
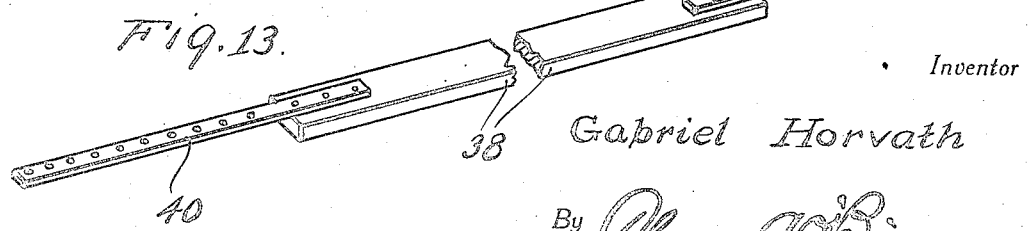

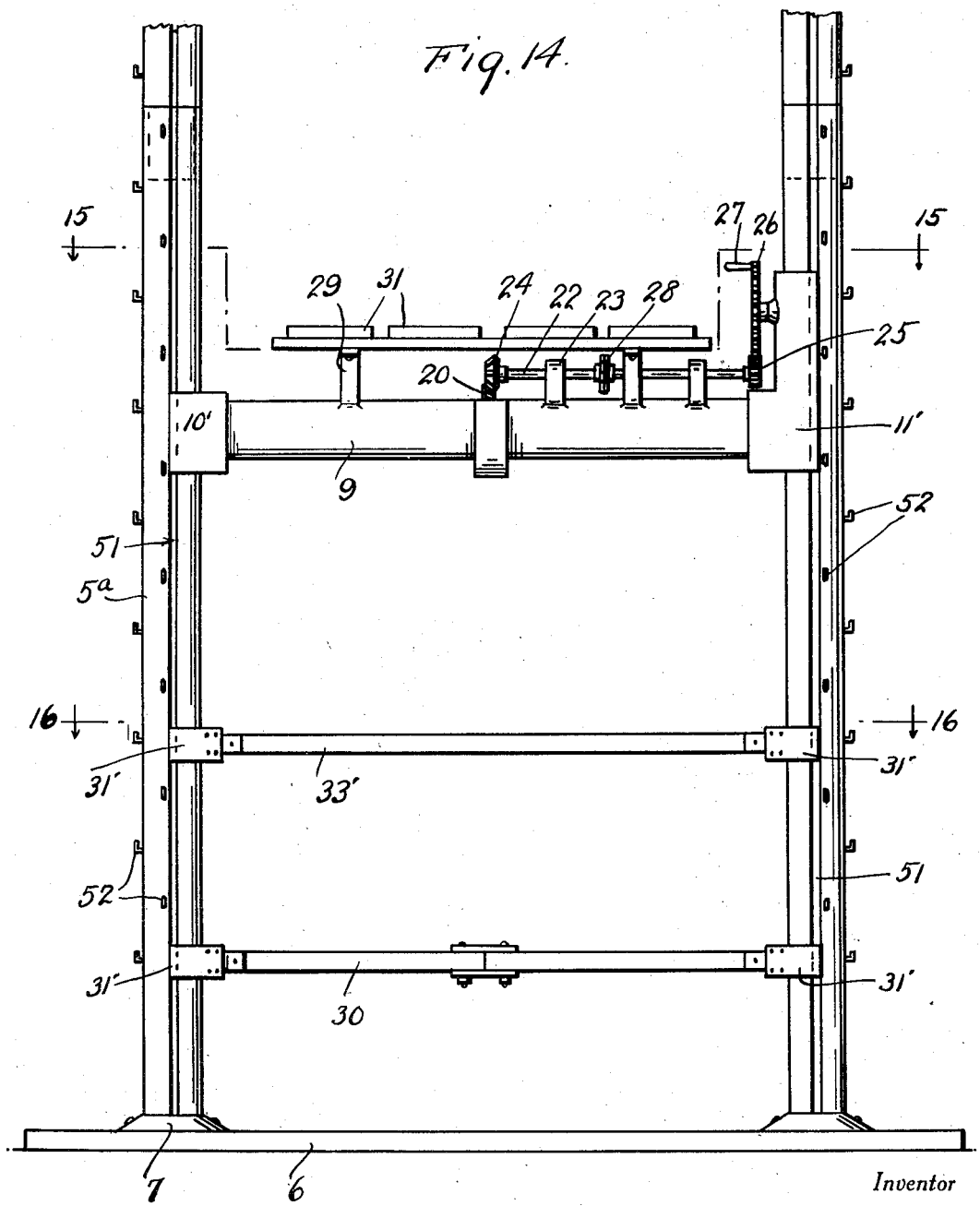

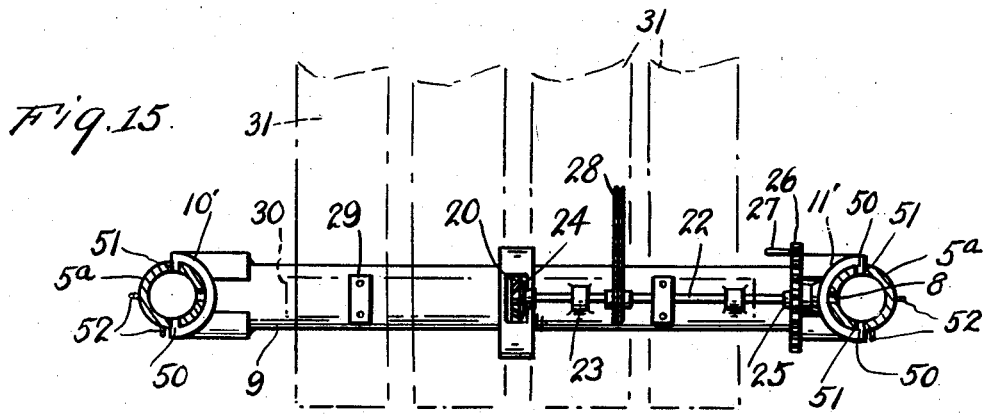
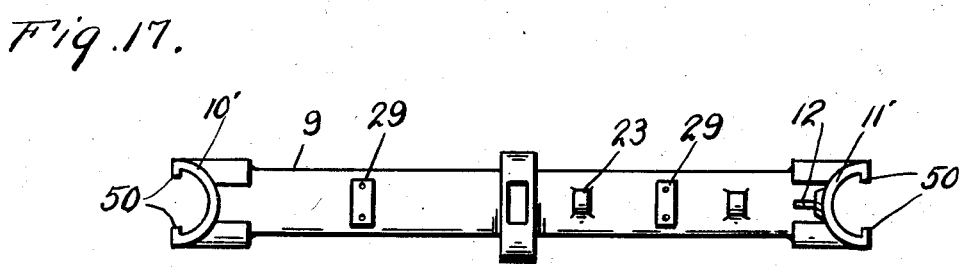
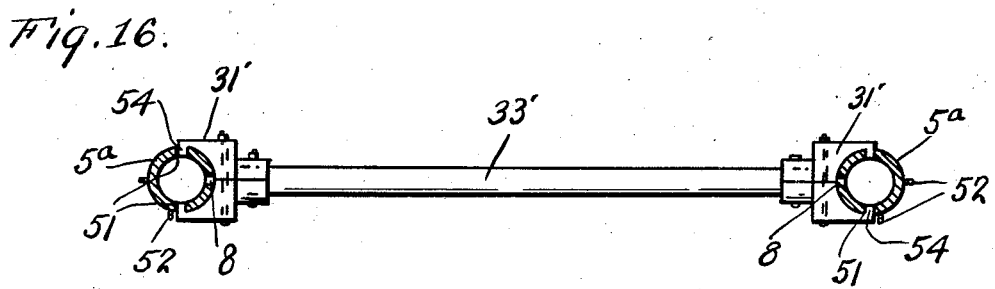
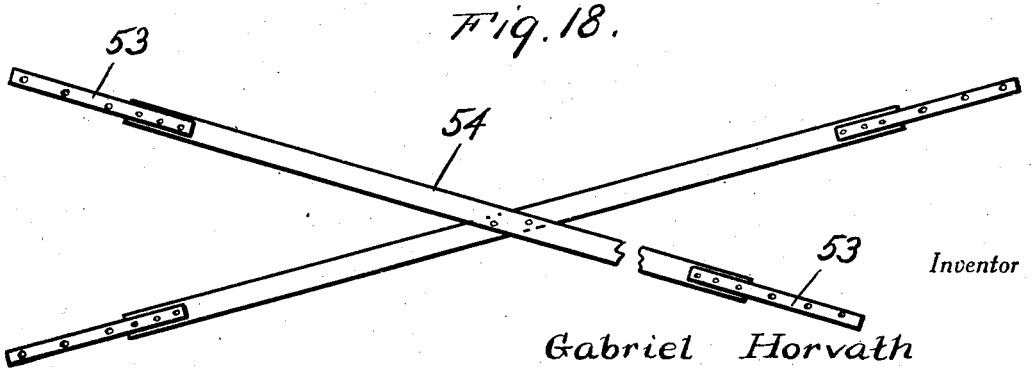

Patented Jan. 6, 1931

1,787,863

UNITED STATES PATENT OFFICE

GABRIEL HORVATH, OF WALLINGFORD, CONNECTICUT, ASSIGNOR OF ONE-HALF TO ANTHONY HORVATH, OF WALLINGFORD, CONNECTICUT

SCAFFOLD

Application filed August 19, 1929. Serial No. 386,934.

The present invention relates to a scaffold for use in conjunction with buildings and the like and has for its prime object to provide a structure which may be elevated with ease and safety.

Another very important object of the invention resides in the provision of a scaffold structure of this nature including a plurality of standards formed in sections so that they may extend to the desired height.

Another very important object of the invention resides in the provision of standards in a scaffold of this nature having a rack structure incorporated therein for cooperation with means on the movable part for raising and lowering said movable part.

Another very important object of the invention resides in the provision of bracing means for holding the structure steady and in a safe condition when in use.

A still further very important object of the invention resides in the provision of a scaffold of this nature which is comparatively simple in its construction, inexpensive to manufacture, easy to assemble and disassemble, compact and convenient in its arrangement of parts, thoroughly efficient and reliable in use and operation, and otherwise well adapted to the purpose for which it is designed.

With the above and numerous other objects in view as will appear as the description proceeds, the invention resides in certain novel features of construction and in the combination and arrangement of parts as will be hereinafter more fully described and claimed.

In the drawing:

Figure 1 is an end elevation of a scaffold embodying the features of my invention, Figure 2 is a top plan view thereof showing parts broken away, Figure 3 is a detail transverse section taken substantially on the line 3—3 of Figure 1, Figure 4 is an enlarged detail section taken substantially on the line 4—4 of Figure 2, Figure 5 is a detail section taken substantially on the line 5—5 of Figure 2, Figure 6 is an enlarged detail section taken substantially on the line 6—6 of Figure 5, Figure 7 is a vertical section through the joint of one of the standards, Figure 8 is a sectional view taken substantially on the line 8—8 of Figure 5.

Figure 9 is a sectional view taken substantially on the line 9—9 of Figure 5, Figure 10 is a detail elevation of the cross braces, Figure 11 is a sectional view therethrough taken substantially on the line 11—11 of Figure 10, Figure 12 is a perspective view of one of the diagonal braces, Figure 13 is a perspective view of one of the supplemental braces,

Figure 14 is an end elevation of another embodiment of the invention, and

Figure 15 is a detail sectional view taken substantially on the line 15—15 of Figure 14, Figure 16 is a sectional view taken substantially on the line 16—16 of Figure 14, Figure 17 is a plan view of one of the hollow cross members, and Figure 18 is a detail view of diagonal braces.

Figure 1:
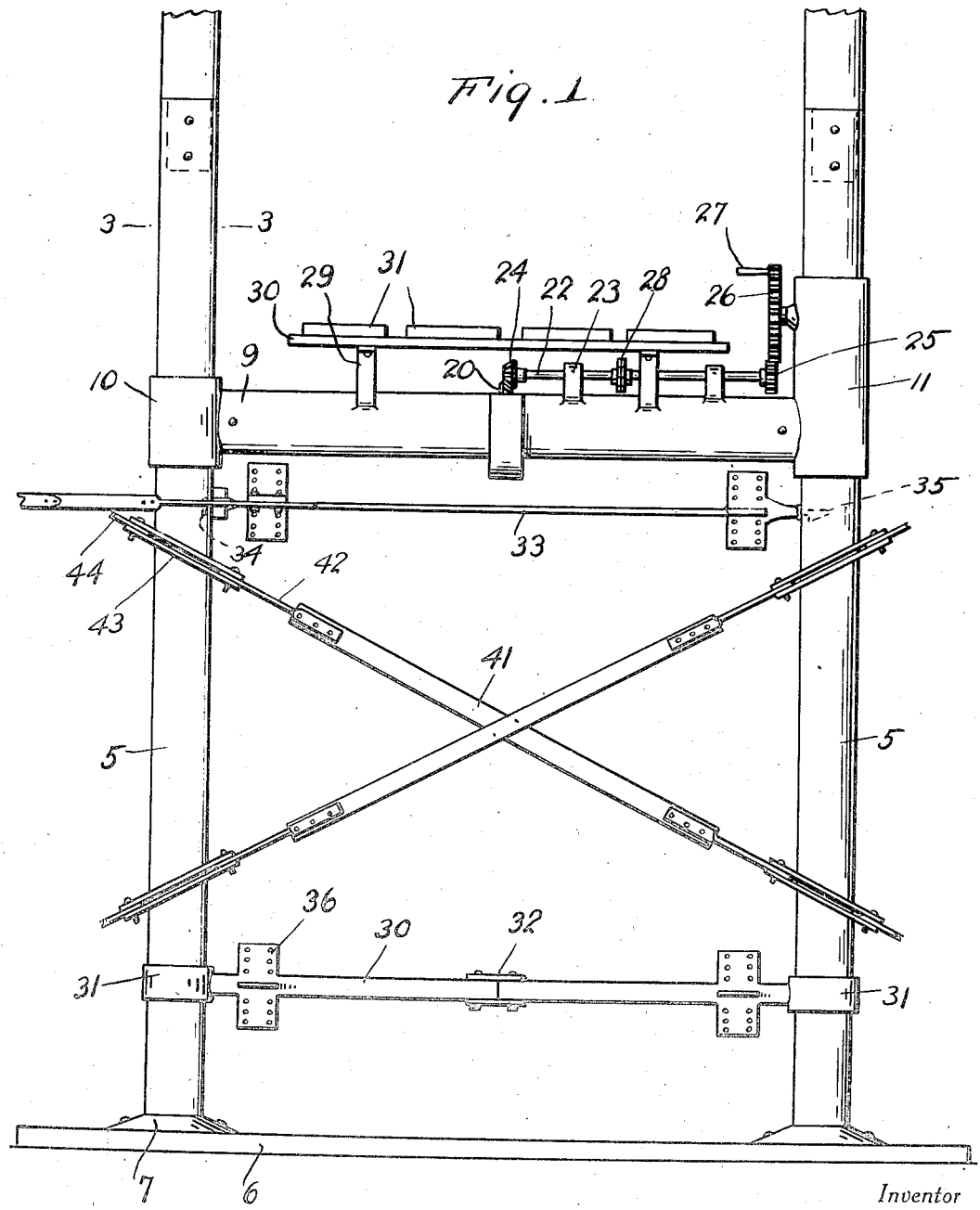

Referring to the drawing in detail it will be seen that the numerals 5 denote four standards which rise from suitable base structure 16 attached thereto by suitable means 7. The standards 5 are formed in sections connected together as is best illustrated in Figure 7 by having lower ends of certain sections reduced as is indicated at 5' to fit within the upper ends of the section from which they extend upwardly.

The standards 5 on their inner sides are formed with racks preferably by being provided with series of openings 8.

A platform includes a pair of cross members 9 of tubular construction and each cross member terminates at one end in a sleeve 10 at right angles thereto and at the other end in a sleeve 11 at right angles thereto, the sleeve 11 being longer than the sleeve 10 and having an inwardly directed stud 12 projecting therefrom.

A shaft 14 is journaled in studs 15 within the tubular cross member 9 and has beveled gears 16 at the ends thereof meshing with beveled gears 17 on shafts 18, the beveled gears 17 being formed with toothed sections 19 to engage the openings 8.

At the center of the shaft 6 there is a beveled gear 20 extending through an opening 21 in the upper portion of the tubular member 9. A shaft 22 is journaled in studs 23 rising from the tubular member and has a beveled gear 24 meshing with the beveled gear 20. A gear 25 is at the other end of the shaft 22 and meshes with a gear 26 rotatable on the stud 12 and having an operating handle 27.

The shafts 22 operate in unison through a chain and sprocket connection 28. Studs 29 rise from the tubular members 9 and support cross bars 30 upon which the ends of planks 31 are secured. Obviously the platform thus constructed may be raised and lowered by turning either of the gears 26 from either end of the platform in a safe, expeditious, efficient and reliable manner.

A cross brace 30 is provided between the lower end of each pair of standards 5 having rings 31 at the ends thereof circumjacent the standards and being formed in sections being formed together by a plate 32. A brace 33 is formed at one end with a hook 34 and at its other end with a spear like head member 35 so as to be engaged with the standards through selected openings 8.

These braces 33 and 30 are formed adjacent the end thereof with radiating apertured plates 36 so that supplemental braces 38 may be engaged therewith by means of straps 39 provided at one end and having straps 40 at the other end thereof to be secured to a building or any other suitable place.

Diagonal braces 41 are provided between each pair of standards 5 and have twisted strap end extensions 42 engaged with rings 43 circumjacent the standards to which may also be connected tie members 44 for further steadying the apparatus in respect to a building or the like.

In Figures 14 to 18 inclusive I have shown another embodiment of the invention very similar to that just described except that tubular cross members 9 have semi-sleeve like members 10′ and 11′ at their ends constructed with inwardly directed ribs 50 to ride in channels 51 formed in standards 5a.

The standards 5a are provided with a plurality of hooks 52 with which may be engaged straps 53 on braces 54. Brace 30′ has clamping sections 31′ on the ends thereof with extensions 54 to engage in the channels 51 and similar end portions are formed on braces 33′.

It is thought that the construction, operation, utility and advantages of this invention will now be quite apparent to those skilled in this art without a more detailed description thereof.

The present embodiments of the invention have been disclosed in considerable detail merely for the purposes of exemplification since in actual practice they attain the features or advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. An apparatus of the class described comprising a plurality of standards, a pair of cross members having right angularly disposed sleeve ends slidable on the standard, said standard having series of openings, rack gears rotatable in the cross members to engage the opening, shafts exteriorly of the cross members, means for journalling the shafts, means gearing the shafts to the rack gears, and means for rotating the shafts.

2. An apparatus of the class described comprising a plurality of standards, a pair of cross members having right angularly disposed sleeve ends slidable on the standard, said standard having series of openings, rack gears rotatable in the cross members to engage the opening, shafts exteriorly of the cross members, means for journalling the shafts, means gearing the shafts to the rack gears, and means for rotating the shafts and means operatively connecting the shafts so that they rotate in unison.

3. An apparatus of the class described comprising a plurality of standards, a pair of cross members having right angularly disposed sleeve ends slidable on the standard, said standard having series of openings, rack gears rotatable in the cross members to engage the opening, shafts exteriorly of the cross members, means for journalling the shafts, means gearing the shafts to the rack gears, and means for rotating the shafts, and means operatively connecting the shafts so that they rotate in unison, each standard being formed in a plurality of sections some of which have lower reduced ends receivable in the upper ends of other sections.

4. An apparatus of the class described comprising a plurality of standards, elements slidable on the standards, tubular cross members between the elements, rack gears in the cross members engageable with openings in the standards, and gearing for operating the rack gears for elevating the cross member, lugs rising from the cross members, bars on the lugs, and planks having their ends resting on the bars.

In testimony whereof I affix my signature.

GABRIEL HORVATH.